Dec. 13, 1938.    B. W. JONES    2,140,386
CONTROL SYSTEM
Filed June 10, 1937    2 Sheets-Sheet 1

Inventor:
Benjamin W. Jones,
by Harry E. Dunham
His Attorney.

Inventor:
Benjamin W. Jones,
by Harry E. Dunham
His Attorney.

Patented Dec. 13, 1938

2,140,386

UNITED STATES PATENT OFFICE 2,140,386

CONTROL SYSTEM

Benjamin W. Jones, Schenectady, N. Y., assignor to General Electric Company, a corporation of New York Application June 10, 1937, Serial No. 147,526

14 Claims. (Cl. 171—119)

My invention relates to control systems in which there is a translating device having a winding on a magnetic core structure embodying a magnetic shunt adjustably positioned adjacent said winding. By adjusting the position of such a magnetic shunt relative to the core structure on which the winding is located, it is possible to control the impedance of the winding and consequently the amount of current that will flow through it.

My invention is particularly applicable to arc welding systems in which the welding current is supplied by a transformer provided with primary and secondary windings located on a core structure which embodies a magnetic shunt adjustably positioned adjacent one of said windings. By adjusting the magnetic shunt, the leakage flux between the primary and secondary windings of the transformer may be controlled in order to control the welding current supplied by the secondary winding of the transformer.

Control systems embodying my invention take advantage of the change in flux in the adjustable magnetic shunt when current flows through the winding located adjacent thereto. The flux density in the magnetic shunt is substantially constant whenever current flows in the winding associated therewith and is substantially zero when no current flows in this winding. In a welding transformer where the magnetic shunt controls the leakage flux between primary and secondary windings, and thus the current delivered by the secondary winding for welding purposes, the constancy of flux in the magnetic shunt for widely varying current adjustments furnishes a means for obtaining a dependable control that is in no way affected by current adjustments.

In accordance with one application of my invention, I place a winding on the magnetic shunt of a welding transformer and employ the voltages induced in this winding for controlling the connection of the transformer to a source of supply or for any other desirable control which is initiated and terminated with the initiation and termination of the flow of welding current supplied by the secondary winding of the welding transformer.

Figure 1:
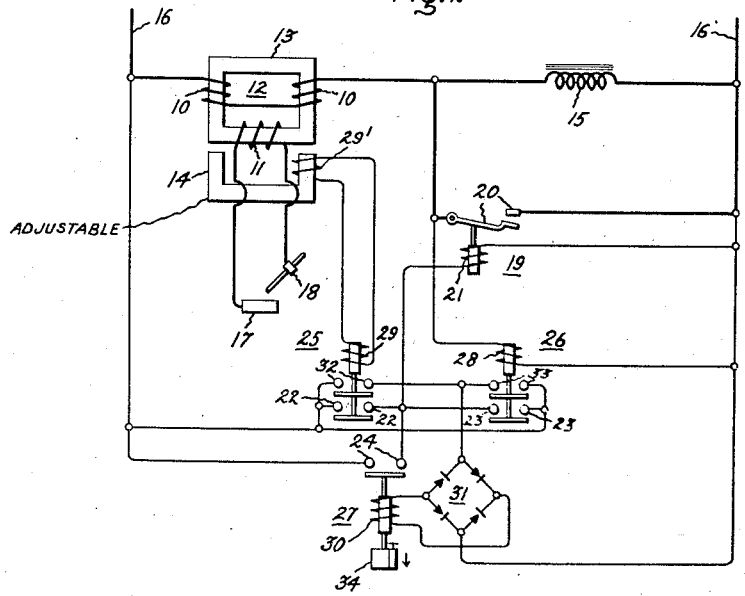
Figure 2:
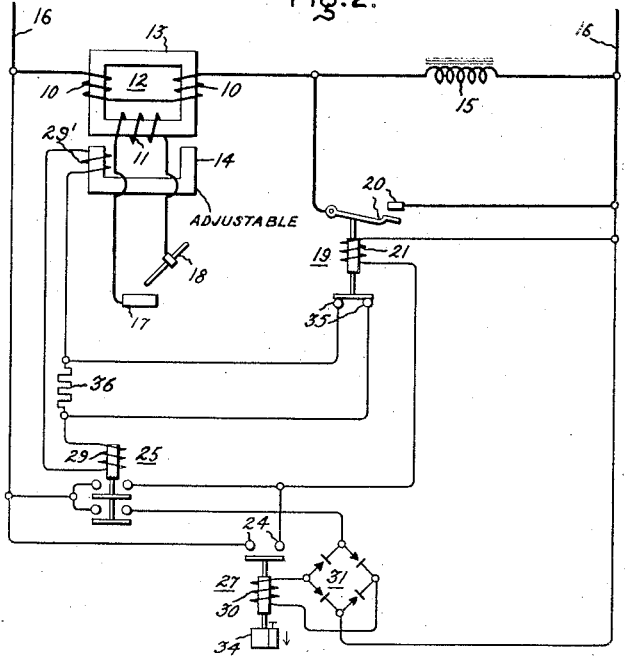
Figure 3:
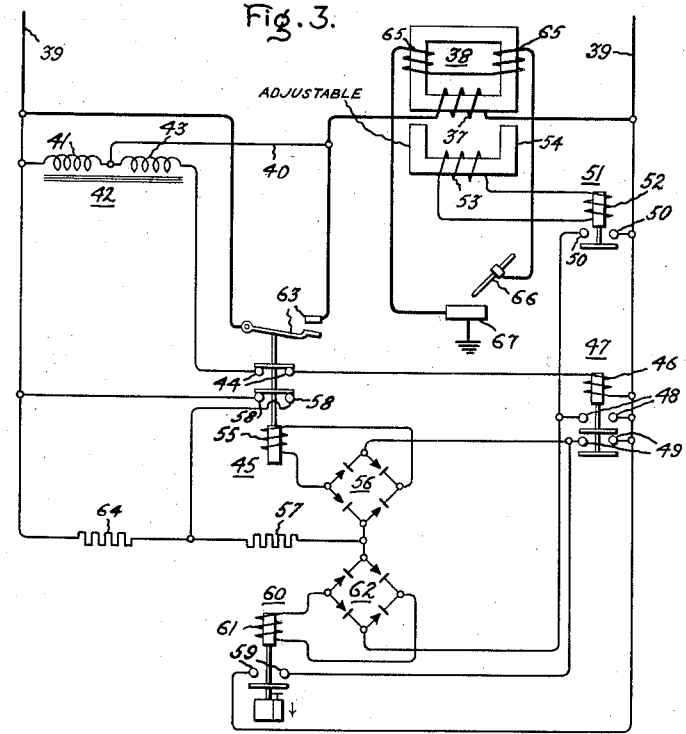
Figure 4:
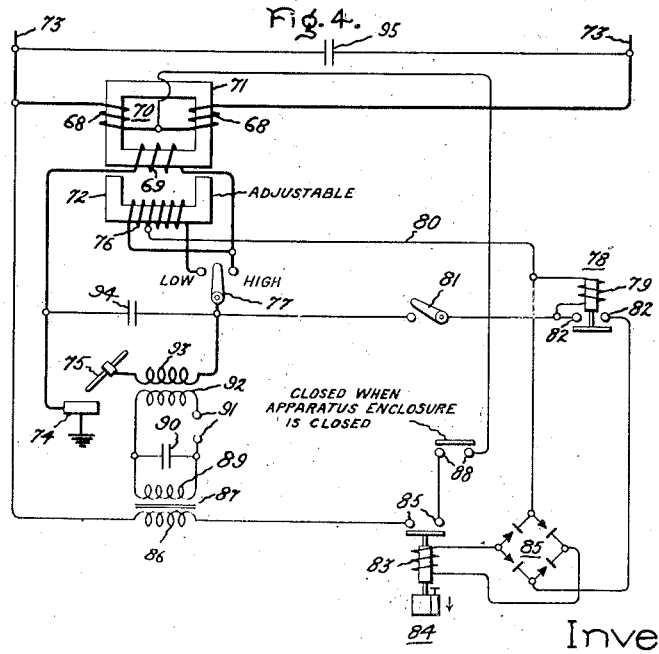

My invention will become apparent from the following description taken in connection with the accompanying drawings in Figs. 1, 2 and 3 of which I have illustrated control systems which function to reduce the open circuit voltage of the welding circuit connected to the secondary winding of a welding transformer and in Fig. 4 of which I have illustrated my invention as applied to a welding system in which the welding arc is stabilized by the application of a high voltage of high frequency which is applied only during welding and if so desired for a predetermined time interval after the welding arc has become extinguished.

In each of these systems the switches and relays have been illustrated in the positions they assume when deenergized.

In Fig. 1, the primary windings 10 and the secondary winding 11 of an arc welding transformer 12 are located on a core structure 13 embodying an adjustable magnetic shunt 14 which is positioned adjacent the secondary winding 11. The primary winding 10 of the transformer 12 is connected in series circuit with an impedance 15 across a source of alternating voltage 16. The secondary winding of the transformer 12 is connected to the work 17 and to a welding electrode 18 between which and the work an arc is established during welding. By adjusting the position of the magnetic shunt 14 relative to the core structure 13 it is possible to secure a wide adjustment of the arc welding current employed during welding. Means not shown in the drawings are provided for adjusting the position of the magnetic shunt 14.

An electromagnetic switch 19 having its contacts 20 connected across the impedance device 15 is employed for removing its effect on the welding transformer 12. The operating winding 21 of this electromagnetic switch is connected across the source of alternating voltage 16 through groups of parallel connected contacts 22, 23, and 24 of relays 25, 26, and 27. The operating winding 28 of relay 26 is connected across the impedance 15. The operating winding 29 of relay 25 is connected to a winding 29' located on the magnetic shunt 14. The operating winding 30 of relay 27 is connected through a rectifier 31 and parallel connected contacts 32 and 33 of relays 25 and 26 across the source of alternating voltage 16.

Relay 26 is responsive to the increase in voltage across the impedance 15 when the secondary circuit of the welding transformer 12 is completed by touching the electrode 18 to the work 17. The voltage of the source 16 will divide across the primary winding 10 of the welding transformer 12 and the impedance 15 in the ratio of their respective impedances. When a circuit is not completed through the secondary winding of the welding transformer, the impedance of its primary winding 10 will be much higher than when a circuit is completed through its secondary winding. Consequently a substantial rise in voltage appears across the impedance 15 when a circuit is completed through the secondary of the welding transformer.

The relay 25 is responsive to the voltage generated in the winding 29' located on the magnetic shunt 14 when a circuit is completed through the secondary winding of the welding transformer. When the secondary circuit is open, substantially zero voltage is generated in the winding 29'. However, irrespective of the adjustment of the magnetic shunt 14 for different welding currents, substantially the same voltage is generated in its winding 29' whenever a circuit is completed through the secondary winding of the welding transformer.

The relay 27 is of the time delay type closing its contacts substantially instantaneously and opening them after a predetermined time interval. This time delay characteristic may be obtained in various ways and in the relay illustrated has been obtained through the agency of a dashpot 34. The relay 27 is a direct current relay receiving its energization from the alternating voltage source 16 through a rectifier 31. It is of course apparent that an alternating voltage time element relay can be employed in place of the direct current relay illustrated.

The operation of the system is substantially as follows: When the operator places the electrode 18 in engagement with the work 17 he completes a circuit through the secondary winding of the welding transformer 12 thereby greatly reducing the impedance of its primary winding 10 and consequently increasing the voltage drop across impedance 15. This increase in voltage, which is applied to the operating winding 28 of the relay 26 causes this relay to close its contacts 23 and 33. The closure of contacts 23 connects the operating winding 21 of electromagnetic switch 19 across the source of supply 16 thus energizing this switch to close its contacts 20 which are connected across impedance 15. The operation of switch 19 removes the effect of impedance 15 on the welding transformer 12 and consequently increases the voltage applied to its primary winding and thus the voltage supplied by its secondary winding.

Shortly after the operator has completed the secondary circuit by touching the electrode 18 to the work 17 and during welding, the winding 29' on magnetic shunt 14 has induced in it a sufficient voltage to operate relay 25. This relay by closing its contacts 22 maintains the energization of the operating winding 21 of electromagnetic switch 19 after contacts 23 of relay 26 have been opened by the deenergization of relay 26 upon the closure of switch contacts 20. The closure of contacts 33 of relay 26 and the subsequent closure of contacts 32 of relay 25 completes and maintains the circuit through winding 30 of relay 27 which closes its contact 24. If, during welding the welding arc is momentarily interrupted the relay 25 may thus open its contacts 22 without interrupting the energizing circuit of electromagnetic switch 19 which is also completed through contacts 24 of relay 27. If the primary circuit of the welding transformer is maintained open for a predetermined length of time, however, contacts 24 of relay 27 will open deenergizing the magnetic switch 19 which again inserts impedance 15 in circuit with the primary winding 10 of the welding transformer 12.

From a consideration of the above, it is apparent that when the secondary circuit of the welding transformer is open, the voltage to which the operator is subjected is materially reduced by the connection of the impedance 15 in series circuit with the primary winding 10 of the welding transformer 12 and that as soon as a circuit is completed through the secondary winding of the welding transformer, the effect of the impedance is removed and high operating voltages are available for performing the welding operation.

The electromagnetic switch and associated relays constitute means for short circuiting the impedance 15 in response to said operating conditions above described. The system as a whole is rendered dependable irrespective of the welding current adjustments by reason of the substantially constant voltage induced in the winding 29' on magnetic shunt 14 for, as has been pointed out above, the voltage induced in this winding is substantially constant while current is flowing in the secondary winding of the welding transformer irrespective of the current adjustment and is substantially zero when current ceases to flow in the secondary winding of the welding transformer.

The control system illustrated in Fig. 2 is the same as that illustrated in Fig. 1 except that it has been simplified by omitting relay 26. The electromagnetic switch 19 is provided with an additional group of contacts 35 which are closed when contacts 20 are open. These contacts 35 are connected across a resistor 36 connected in circuit with the winding 29' on magnetic shunt 14 and with the operating winding 29 of relay 25.

The operation of the system is believed to be apparent from the description above given of the operation of Fig. 1. It is to be noted, however, that when the impedance 15 is connected in circuit with the transformer 12 that the resistance 36 is short circuited by contacts 35 of electromagnetic switch 19, so that the lower voltage available in winding 29' is sufficient to operate relay 25. When the electromagnetic switch 19 closes its contacts 20 its opens contacts 35 and inserts resistance 36 in circuit with winding 29' and winding 29.

In the system illustrated in Fig. 3, the primary winding 37 of welding transformer 38 is connected across a source of alternating voltage 39 through a conductor 40 and a portion 41 of a reactor 42. The portion 43 of the reactor 42 is connected in parallel with the primary winding 37 of the welding transformer through a circuit including contacts 44 of electromagnetic switch 45 and the operating winding 46 of a relay 47. The arrangement is such that only a part of the total voltage of the source 39 appears across the primary winding 37 of the welding transformer. For example, 70 per cent of the voltage may appear across the portion 41 of the impedance 42 and the remaining 30 per cent across the primary 37 of the welding transformer.

The relay 47 is provided with two groups of contacts 48 and 49. Contacts 48 are connected in parallel with contacts 50 of a relay 51 whose operating winding 52 is connected to a winding 53 located on the adjustable magnetic shunt 54 of the welding transformer. The operating winding 55 of electromagnetic switch 45 is connected across the source 39 through contacts 49 of relay 47, rectifier 56, resistor 57 and contacts 58 of electromagnetic switch 45. The contacts 49 of relay 47 are paralleled by contacts 59 of a relay 60 whose operating winding 61 is connected across the source 39 through either of the parallel connected contacts 50 and 48 of relays 51 and 47, rectifier 62, resistor 57, and contacts 58 of electromagnetic switch 45. When electromagnetic switch 45 is energized it closes its contacts 63 and opens its contacts 58. The opening of contacts 58 inserts a resistor 64 in circuit with the respective operating windings 55 and 61 of electromagnetic switch 45 and relay 60. The closure of contacts 63 of electromagnetic switch 45 short circuits the portion 41 of the impedance 42 and connects the primary winding 37 of the welding transformer directly to the source of supply 39.

The relay 60 is of the time delay type having a substantially instantaneous closing and a predetermined delayed opening. The relay 47 is responsive to the voltage induced in the portion 43 of the impedance 42 when the impedance of the primary winding 37 of the welding transformer is reduced by completing a circuit through the secondary winding 65 of the transformer by touching the welding electrode 66 to the work 67. The relay 51 is responsive to the voltage induced in the winding 53 on magnetic shunt 54 when a circuit is completed through the secondary 65 of the welding transformer.

The organization of the system of Fig. 3 will be better understood from a consideration of its operation.

When the operator touches the electrode 66 to the work 67 the impedance of the primary winding 37 of the transformer 38 is greatly reduced and the voltage induced in the portion 43 of the impedance 42 acting as an autotransformer energizes the operating winding 46 of relay 47. This winding is connected in circuit with portion 43 of the impedance 42 through the primary winding of the transformer and contacts 44 of electromagnetic switch 45. Upon the energization of relay 47, it closes its contacts 48 and 49.

The closure of contacts 49 connects the operating winding 55 of the electromagnetic switch 45 across the source of supply 39 through rectifier 56, resistance 57 and contacts 58 of the electromagnetic switch. The energization of the operating winding 55 of the electromagnetic switch causes it to close its contacts 63 and open its contacts 44 and 58. The closure of contacts 63 connects the primary winding 37 of the welding transformer directly to the source of supply 39. The opening of contacts 44 deenergizes the operating winding of relay 47 and the opening of contacts 58 inserts resistor 64 in circuit with the operating windings 55 and 61 of switch 45 and relay 60.

The closure of contacts 48 of relay 47 initially completes the energizing circuit of winding 61 of relay 60 by connecting this winding across the source 39 through rectifier 62, resistor 57, and contacts 58 of switch 45. The operation of relay 60 when thus energized completes a circuit through contacts 59 which parallel contacts 49 of relay 47 so that when relay 47 became deenergized by the opening of contacts 44 of switch 45, the operating winding 55 of this switch would still be energized through contacts 59 of relay 60. Winding 61 is maintained connected across the source 39 through contacts 50 of relay 51. These contacts parallel contacts 48 of relay 47 so that when relay 47 is deenergized relay 60 is energized through contacts 50 of relay 51. Relay 51 is energized from the winding 53 on magnetic shunt 54 of the welding transformer. So long as a circuit is completed through the secondary 65 of the welding transformer, sufficient voltage is induced in the winding 53 to energize winding 52 of relay 51 sufficiently to maintain its contacts 50 closed. As soon as the secondary circuit of the welding transformer is opened however, insufficient voltage is applied to winding 52 of relay 51 by winding 53, and relay 51 opens its contacts 50 thus deenergizing relay 60. This relay by opening its contacts 59 deenergizes the operating winding 55 of switch 45 thus causing this switch to open and return the circuit to its initial condition.

It will be seen that the system of Fig. 3 is the functional equivalent of the system illustrated in Figs. 1 and 2 and operates to reduce the open circuit voltage of the welding transformer and to increase this voltage upon the completion of a circuit through the secondary winding of the welding transformer.

The system illustrated in Fig. 4 is adapted for welding at low current values. For this type of welding in order to maintain a stable arc, it is highly desirable to superimpose on the welding leads a high voltage of sufficiently high frequency to be harmless to the operator. This high voltage high frequency is supplied by an oscillation generator which is energized and deenergized through the agency of a relay. The arrangement is such that the oscillation generator is energized when the welder starts to weld and is deenergized one or two seconds after he finishes a weld. This control reduces the duty on the oscillation generator and enables the operator to change electrodes without having annoying high frequency sparks jump to his fingers. As pointed out above the high frequency is no hazard to the operator except as an annoyance which might produce a reflex action that may place the operator in jeopardy.

In Fig. 4 the primary winding 68 and the secondary winding 69 of a welding transformer 70 are located on a core structure 71 embodying an adjustable magnetic shunt 72 which is positioned adjacent the secondary winding 69 of the transformer. The primary winding 68 of the transformer is connected to a source of alternating voltage 73 and the secondary 69 is connected to the work 74 and electrode 75 independently of, or in circuit with a winding 76 on the adjustable magnetic shunt 72. This connection is under the control of a switch 77.

When the winding 76 is connected in circuit with the secondary winding of the transformer the range of current adjustment is increased from that attainable by solely adjusting the magnetic shunt 72. The addition of winding 76 to the circuit changes the number of turns acting on the leakage flux through the magnetic shunt 72. As the reactance of a winding about a magnetic circuit varies as the square of the number of turns acting thereof, it is apparent that if the number of turns in the winding 76 are equal to the number of turns in the secondary winding that the reactance for a given position of the magnetic shunt will be approximately four times the reactance when only the secondary of the transformer is connected in the welding circuit.

The winding 76 on the magnetic shunt 72 is used as in the previous figures to energize a relay 78. The operating winding 79 of this relay is connected across a portion of the winding 76 through conductor 80, switch 81 and switch 77 when these latter switches are in their closed positions. Relay 78 completes through its contacts 82 an energizing circuit for the winding 83 of relay 84. This winding is connected across a rectifier 85 which is directly connected across a portion of the winding 76 through contacts 82 of relay 78. Relay 84 is of the time delay type and upon energization closes its contacts 85 substantially instantaneously and upon deenergization opens these contacts after a predetermined interval of time.

A circuit through the primary 86 of a step-up transformer 87 is connected across one of the windings of the primary 68 of transformer 70 through a circuit including contacts 85 of relay 84 and a switch having contacts 88. Contacts 88 are mechanically associated with the enclosure for the apparatus illustrated and are closed when the apparatus enclosure is closed and opened when the enclosure is opened. As will appear from what is stated below, these contacts are safety contacts for protecting the operator using the welding apparatus.

The secondary 89 of a step-up transformer 87 forming part of the oscillation generator is connected across a capacitor 90. When the voltage across this capacitor has reached a certain value, it discharges through spark gap 91 and the primary 92 of an oscillating inductance. The constants of the capacitor and inductance are so chosen that the frequency of the discharge is very high. A secondary winding 93 connected in the welding circuit has this high frequency induced in it and impresses across the welding arc the high frequency generated in the oscillating circuit. A circuit through the arc for the high frequency is provided by a small by-pass capacitor 94.

The step-up transformer 87 impresses a voltage of about 2000 to 4000 volts on the capacitor 90. The operator is protected from this voltage by the safety switch 88 above referred to. Further protection is provided by making the oscillating inductance in two parts 92 and 93 and insulating them from one another. Still further protection is obtained by leaving the oscillating circuit ungrounded and grounding one of the welding leads. In addition to this, the circuit is in itself more or less inherently safe. The maximum output short circuit current of the step-up transformer 87 is so low as to be harmless. Furthermore, it is impossible to build up any high 60 cycle voltage across the oscillating inductance because of its low value which at 60 cycle voltage is a dead short circuit for the step-up transformer.

A small blocking condenser 95 is connected across the primary leads of the welding transformer to obviate radio interference which might be caused by radiation from the primary windings of the welding transformer which are connected to the source of supply 73.

In view of the operation of the systems above described in Figs. 1, 2 and 3, it is believed to be apparent that as soon as the circuit is completed through the secondary of the welding transformer, the voltage induced in winding 76 on magnetic shunt 72 energizes relay 78 which in turn connects through its contacts 82, the operating winding 83 of relay 84 to this same winding. The closure of contacts 85 of relay 84 energizes the oscillation generator which supplies high frequency across the welding arc during welding. At the termination of a welding operation the oscillation generator is deenergized by the opening of contacts 85 of relay 84 after a predetermined time interval determined by this relay. Thus, during welding and for a time sufficient to enable the operator to restrike a welding arc, a stabilizing high frequency voltage is impressed across the electrodes. The generation of this high frequency voltage is dependent upon the voltage induced in the magnetic shunt 72 of the welding transformer, when a circuit is completed through the secondary 69 of the welding transformer.

Each of the above systems are safe and dependable in operation. Safety has been obtained in the systems of Figs. 1, 2 and 3 by an organization such that on failure of any part of the system to function the operator is protected from the high voltage used during welding. That is, these systems "fail safe."

In each of the systems above described, the time delay relay may be omitted if desired. As has been mentioned above, the rectifiers disclosed have been employed in order to use with an alternating voltage source of supply direct current relays having desirable operating characteristics.

In those systems defined by the claims, it is to be understood that the specification of a transformer having primary and secondary windings is not to be limited to a transformer having separate and distinct primary and secondary windings such as have been illustrated and described above in disclosing certain applications of my invention.

The above systems which have been described are merely illustrative of control systems whose operation is determined by the voltages induced in a winding located on an adjustable magnetic shunt forming part of a translating device included in the systems. It is apparent that to those skilled in the art other systems will readily suggest themselves in view of the above disclosures with regard to four systems. It is consequently apparent that my invention is not limited to the particular systems illustrated and described and I aim consequently to cover by the appended claims all those modifications which fall within the spirit and scope of my invention.

What I claim as new and desire to secure by Letters Patent of the United States, is:

1. A control system comprising a translating device having a winding on a magnetic core structure embodying a magnetic shunt adjustably positioned adjacent said winding, means for adjusting the position of said magnetic shunt relative to said winding and said core structure to control the flow of current through said winding, a winding on said magnetic shunt, a control conductor, and means responsive to the flux change in said magnetic shunt between a substantially constant value when current flows in said first-mentioned winding and substantially zero value when no current flows in said first-mentioned winding for controlling a circuit through said control conductor in response to the completion and interruption of a circuit through said first mentioned winding, said means including a relay having a winding connected to said winding on said magnetic shunt and contacts connected in said control circuit.

2. A control system comprising a transformer having primary and secondary windings on a core structure embodying a magnetic shunt adjustably positioned adjacent one of said windings, a winding on said magnetic shunt, and means for completing and interrupting a circuit through a control conductor in response to the completion and interruption of a circuit through the secondary winding of said transformer, said means including a relay having an operating winding connected to said winding on said magnetic shunt.

3. A control system comprising a transformer having primary and secondary windings on a core structure embodying a magnetic shunt adjustably positioned adjacent one of said windings, a winding on said magnetic shunt, a control conductor, and means for completing a circuit through said control conductor upon the completion of a circuit through a secondary winding of said transformer and for interrupting the circuit through said control conductor a predetermined time interval after the interruption of the circuit through a secondary winding of said transformer, said means including a relay provided with contacts and having an operating winding connected to said winding on said magnetic shunt and a time element relay having an operating winding connected in circuit with said contacts of said first-mentioned relay and having its own contacts connected in said control circuit.

4. A control system comprising a transformer having primary and secondary windings on a core structure embodying a magnetic shunt adjustably positioned adjacent one of said windings, a winding on said magnetic shunt, a source of alternating voltage, an impedance connected in series circuit with the primary winding of said transformer across said source of alternating voltage, an electromagnetic switch having contacts connected across said impedance and means including a relay for controlling the operation of said electromagnetic switch, said relay having an operating winding connected to said winding on said magnetic shunt.

5. A control system comprising a transformer having primary and secondary windings, an impedance device connected in circuit with one of said windings, and means including a relay for removing the effect of said impedance device on said transformer, said relay having a winding connected to said impedance and responsive to the voltage thereof when a circuit is completed through the secondary of said transformer.

6. A control system comprising a transformer having primary and secondary windings, a source of alternating voltage, an impedance device connected in series circuit with the primary winding of said transformer across said source of alternating voltage, and means including a relay for removing the effect of said impedance device on said transformer, said relay having a winding connected to said impedance and responsive to the voltage thereof when a circuit is completed through the secondary of said transformer.

7. A control system comprising a transformer having primary and secondary windings on a core structure embodying a magnetic shunt adjustably positioned adjacent one of said windings, a winding on said magnetic shunt, means including an impedance connected in circuit with one of said windings of said transformer for controlling the voltage of its secondary winding, and means for controlling said impedance in response to the completion of a circuit through the secondary winding of said transformer, said means including two relays having parallel connected contacts, the first relay having an operating winding connected to be responsive to the voltage of said impedance upon the completion of a circuit through the secondary winding of said transformer and the second of said relays having an operating winding connected to said winding on said magnetic shunt.

8. A control system comprising a transformer having primary and secondary windings on a core structure embodying a magnetic shunt adjustably positioned adjacent one of said windings, a winding on said magnetic shunt, a source of alternating voltage, an impedance connected in series circuit with the primary winding of said transformer across said source of alternating voltage, an electromagnetic switch having an operating winding and having contacts connected across said impedance, and a relay having an operating winding connected to said winding on said magnetic shunt and having contracts connected in circuit with the operating winding of said electromagnetic switch.

9. A control system comprising a transformer having primary and secondary windings on a core structure embodying a magnetic shunt adjustably positioned adjacent one of said windings, a winding on said magnetic shunt, a source of alternating voltage, an impedance connected in series circuit with the primary winding of said transformer across said source of alternating voltage, a relay, having groups of contacts and having an operating winding connected to said winding on said magnetic shunt, a time element relay having contacts connected in parallel with one group of contacts of said first-mentioned relay and having an operating winding connected across said source of alternating voltage in circuit with another group of contacts of said first-mentioned relay, and an electromagnetic switch having contacts connected across said impedance and having an operating winding connected across said source of alternating voltage in circuit with said parallel connected groups of contacts of said relays.

10. A control system comprising a transformer having primary and secondary windings on a core structure embodying a magnetic shunt adjustably positioned adjacent one of said windings, a winding on said magnetic shunt, a source of alternating voltage, an impedance connected in series circuit with the primary winding of said transformer across said source of alternating voltage, two relays having parallel connected contacts, the first relay having an operating winding connected to be responsive to the voltage drop across said impedance upon the completion of a circuit through the secondary winding of said transformer and the second of said relays having an operating winding connected to said winding of said magnetic shunt, and an electromagnetic switch having its contacts connected across said impedance and having its operating winding connected in circuit with said parallel connected contacts of said relays.

11. A control system comprising a transformer having primary and secondary windings on a core structure embodying a magnetic shunt adjustably positioned adjacent one of said windings, a winding on said magnetic shunt, a source of alternating voltage, an impedance connected in series circuit with the primary winding of said transformer across said source of alternating voltage, means for short circuiting said impedance, said means including a relay operating in response to the increase of voltage in said impedance when a circuit is completed through the secondary winding of said transformer, and having an operating winding connected to said impedance, and means for maintaining a short circuit about said impedance so long as a circuit is completed through the secondary winding of said transformer, said means including a second relay having an operating winding connected to said winding on said magnetic shunt.

12. A control system comprising a transformer having primary and secondary windings on a core structure embodying a magnetic shunt adjustably positioned adjacent one of said windings, a winding on said magnetic shunt, a source of alternating voltage, an impedance connected in the series circuit with the primary winding of said transformer across said source of alternating voltage, three relays, the first of which has an operating winding connected to be responsive to the voltage drop across said impedance upon the completion of a circuit through the secondary winding of said transformer, the second of which has an operating coil connected to said winding on said magnetic shunt and the third of which is a time element relay having an operating winding connected across said source of alternating voltage, each of said relays having parallel connected contacts and said first and second relays having additional parallel connected contacts connected in circuit with the winding of said third relay, and an electromagnetic switch having its contacts connected across said impedance and having an operating coil connected across said source of alternating voltage through the parallel connected contacts of said three relays.

13. A control system comprising a transformer having primary and secondary windings on a core structure embodying a magnetic shunt adjustably positioned adjacent one of said windings, a winding on said magnetic shunt, a source of alternating voltage, an impedance connected in series circuit with the primary winding of said transformer across said source of alternating voltage, means for short circuiting said impedance, said means including a relay operating in response to the increase of voltage in said impedance when a circuit is completed through the secondary winding of said transformer and having an operating winding connected to said impedance, means for maintaining a short circuit about said impedance so long as a circuit is completed through the secondary winding of said transformer, said means including a second relay having an operating winding connected to said winding on said magnetic shunt, and means for maintaining said short circuit about said impedance for a predetermined time interval after the circuit through the secondary of said welding transformer has been interrupted, said means including a time element relay having an operating winding whose energization is controlled by said second relay.

14. A control system comprising a transformer having primary and secondary windings on a core structure embodying a magnetic shunt adjustably positioned adjacent one of said windings, a winding on said magnetic shunt, a source of alternating voltage, an impedance connected in series circuit with the primary winding of said transformer across said source of alternating voltage, a relay having groups of contacts and having its operating winding connected to said winding on said magnetic shunt, a time element relay having contacts connected in parallel with one group of contacts of said first-mentioned relay and having an operating winding connected across said source of alternating voltage in circuit with another group of contacts of said first-mentioned relay, a resistance connected in circuit with said winding on said magnetic shunt and with said operating windings of said first-mentioned relay, and an electromagnetic switch having two groups of contacts, one group of which is connected across said impedance and the other group of which is connected across said resistance, said switch having an operating coil connected across said source of alternating voltage in circuit with said parallel connected groups of contacts of said relays.

BENJAMIN W. JONES.